United States Patent [19]
Griswold

[11] 3,798,743
[45] Mar. 26, 1974

[54] METHOD OF INSTALLING PHOTOELECTRIC CELL IN A DRIVEWAY

[76] Inventor: Edward A. Griswold, 2071 E. Galbreth Rd., Pasadena, Calif. 91107

[22] Filed: Mar. 9, 1972

[21] Appl. No.: 233,335

Related U.S. Application Data

[60] Continuation of Ser. No. 883,107, Dec. 8, 1969, abandoned, which is a division of Ser. No. 488,946, Sept. 21, 1965, Pat. No. 3,483,507.

[52] U.S. Cl.................................... 29/428, 404/11
[51] Int. Cl............................................. B23p 19/00
[58] Field of Search ....... 29/428; 404/11; 340/38 R, 340/38 P, 39; 250/239

[56] References Cited
UNITED STATES PATENTS

| | | | |
|---|---|---|---|
| 1,764,368 | 6/1930 | Thomas | 250/239 |
| 2,441,554 | 5/1948 | Barker | 340/39 UX |
| 3,408,563 | 10/1968 | Shapman et al. | 340/38 R X |

FOREIGN PATENTS OR APPLICATIONS

| | | | |
|---|---|---|---|
| 696,707 | 9/1953 | Great Britain | 404/11 |

Primary Examiner—Charlie T. Moon
Attorney, Agent, or Firm—William W. Haefliger

[57] ABSTRACT

The disclosure concerns a system for sensing the passage of a vehicle or similar object, and a method of system installation, wherein the response of a photocell, installed near the surface of a driveway, is such that the cell output signal changes to the extent required (for alarm actuation) for a substantial change in incident light. This is true under the wide range of ambient light conditions normally encountered whereby the alarm can be made to respond to vehicles and not to casual moving shadows.

6 Claims, 12 Drawing Figures

PATENTED MAR 26 1974
3,798,743
SHEET 1 OF 2
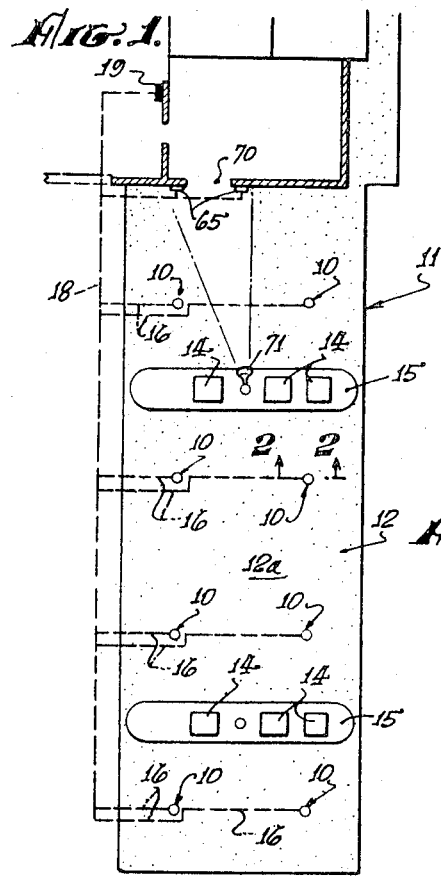
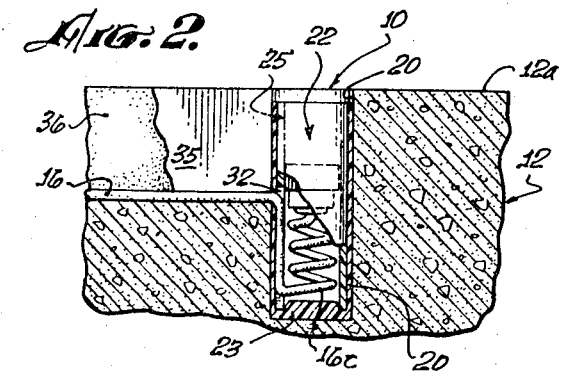
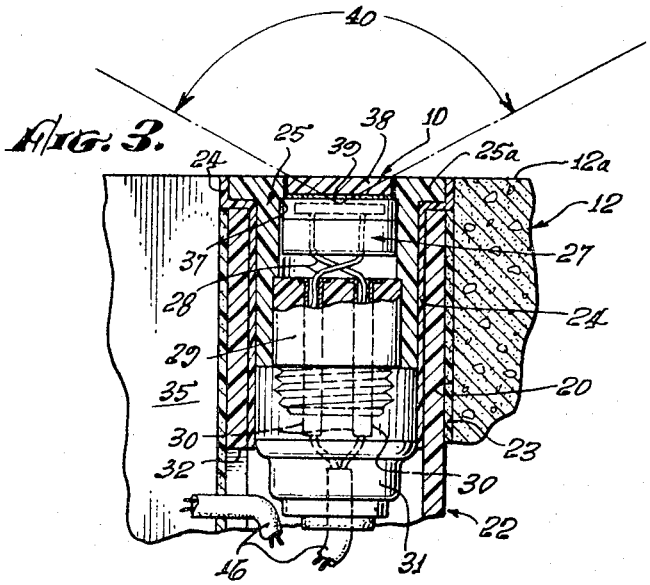
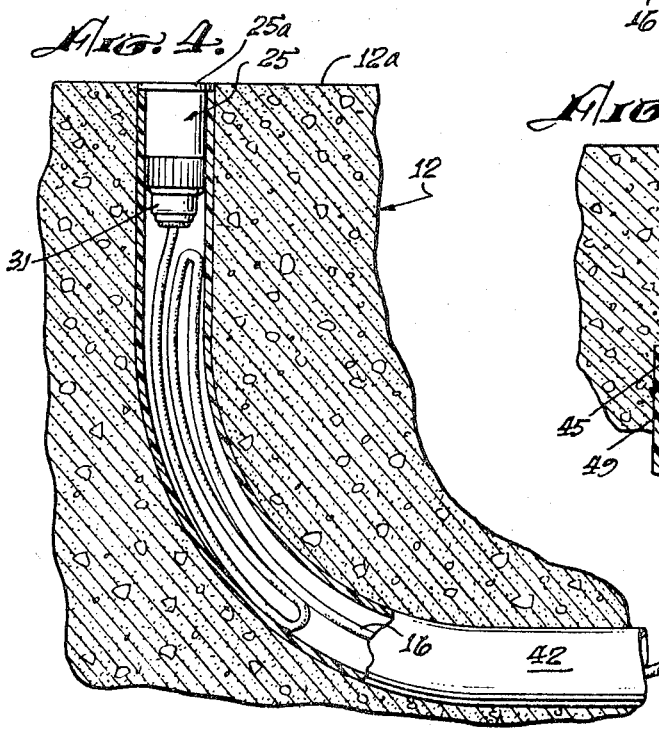
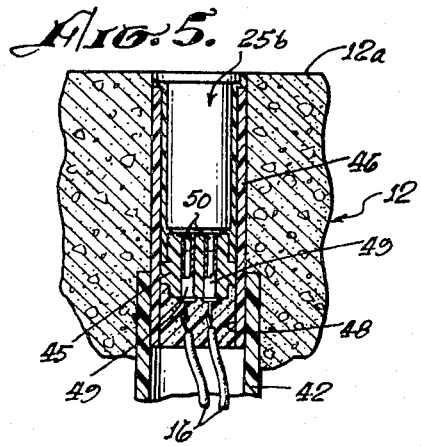
INVENTOR
EDWARD A. GRISWOLD
By Knight & Rodgers
Attorneys

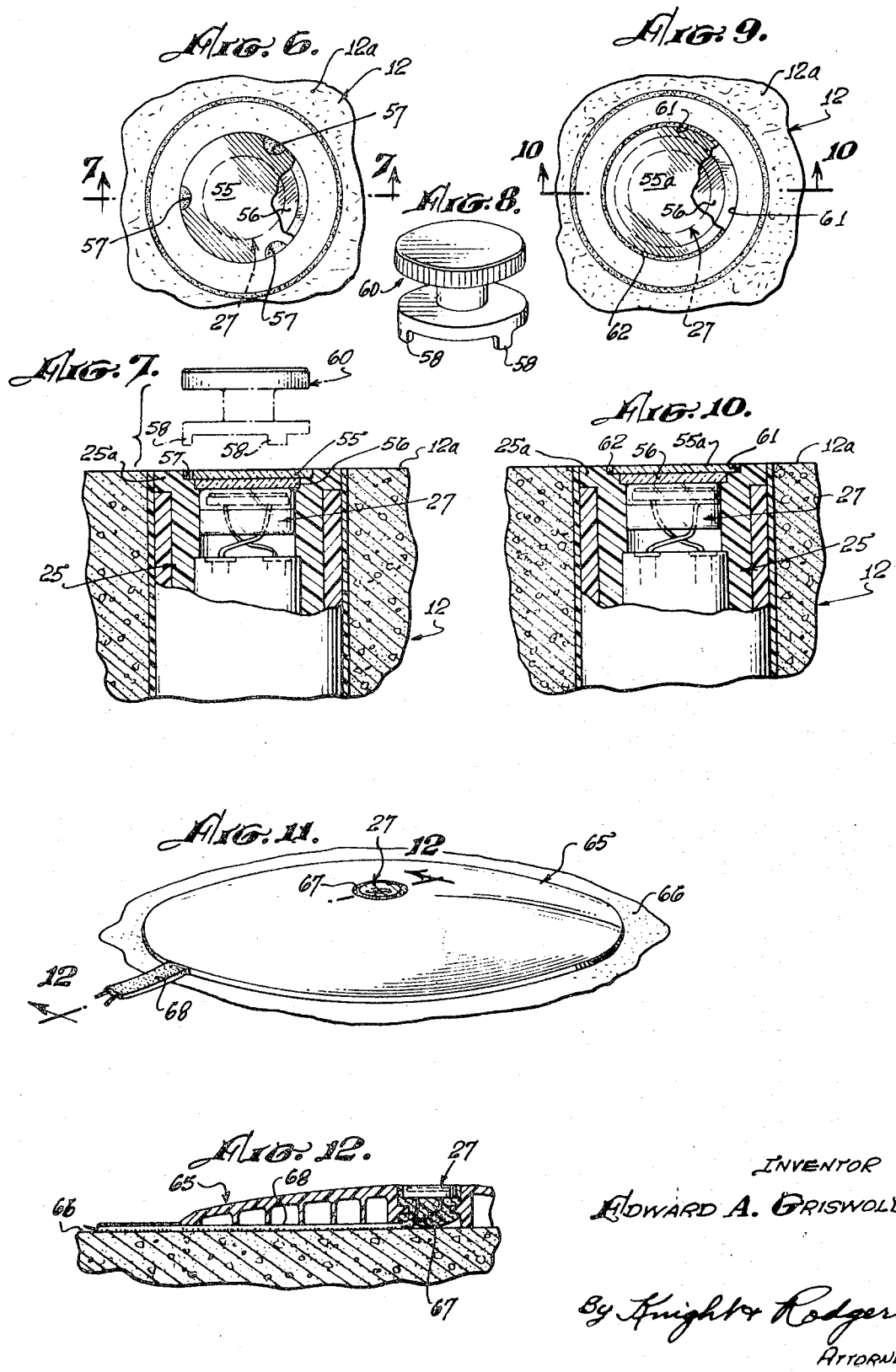

METHOD OF INSTALLING PHOTOELECTRIC CELL IN A DRIVEWAY

CROSS-REFERENCE TO RELATED APPLICATION

This is a continuation, of application Ser. No. 883,107, filed Dec. 8, 1969, now abandoned, which application is a division of my application of the same title, Ser. No. 488,946, filed Sept. 21, 1965, now U.S. Pat. No. 3,483,507.

FIELD OF THE INVENTION

The present invention relates generally to an electrical system for sensing the movement or passage of a vehicle or other object; and more particularly to a system of this type including a photoelectric cell which may be designed to operate an alarm or signal in response to a change in light incident on the cell, as for example a vehicle entering a service station.

BACKGROUND OF THE INVENTION

There is a well-known and widely recognized need in automobile service stations, as a typical example, of a system to signal the arrival of an automobile or a truck at the fuel pumps for refueling or other service. A signal system of this type has many advantages since it alerts operating personnel immediately to the arrival of a potential customer and permits service to be rendered more promptly and without any delays irritating to the customer. Signal systems of this character generally require some type of remote operation in order to remove from the vicinity of the fuel pumps, which is considered a hazardous area, any electrical connections or electrical equipment which use enough power to cause a spark and therefore to create a hazardous condition.

Various types of systems have been installed including some component or member in the path of the vehicle to activate the signal system in response to travel of the vehicle. One example of a widely used type of signal system is an elastic tube stretched across the driveway at the fuel pumps and which is compressed by travel of the vehicle over the tube, the increased air pressure within the tube activating electric switches at a position outside the hazardous area.

A particular disadvantage of this type of installation is that the elastic tube is loose and can easily be carried away from its proper position unless it is anchored down in some way. Whether loose or anchored, the tube projects above the otherwise smooth surface of the driveway and constitutes a hazard to pedestrian travel. A hazard of this character to operating personnel, and particularly to customers walking on the driveway and perhaps less observant than an employee, is to be avoided wherever possible.

Another disadvantage of signal systems including an elastic tube of this type is that they frequently malfunction and require a substantial amount of maintenance because of deterioration from wear in normal usage and from weathering since they are exposed to the sun, rain, and a full range of temperature changes.

As an alternative arrangement, photoelectric cells have been tried but all such installations known to applicant have suffered from various disadvantages, chiefly due to the fact that they are particularly subject to false alarms. If the photoelectric cell is made too sensitive, it is triggered by transient changes, such as the shadow of a person walking by the cell, or any other random shadow which affects the change in the light incident on the cell. On the other hand, if this problem is countered by making the cell less sensitive, then known types of systems are oftentimes found to be insensate under the same ambient light conditions.

SUMMARY OF THE INVENTION

It is a general object of the invention to provide an improved system for sensing the movement of an object such as a vehicle by the change in incident light thereby created on an element of the system.

It is also a general object of the present invention to provide an installation of a photoelectric cell for an alarm system which effectively removes from the driveway adjacent the fuel pumps all protrusions or projections above the normal plane surface of the driveway, thereby eliminating any object over which a pedestrian or customer may trip and fall.

It is an object of the present invention to provide a photoelectric cell installation for an alarm system of the character described which responds promptly and accurately to the presence of a vehicle but which is not triggered to render false alarms by smaller objects or transient shadows cast on the cell.

A further object of the invention is to provide a photoelectric cell installation of the character described which is easy and simple to install and yet which is of a character that it can be used safely in a hazardous area such as the apron of a driveway adjoining fuel pumps where flammable liquids are often spilled on the driveway.

A further object of the present invention is to provide a novel construction for the installation of a photoelectric cell of the character described which is reliable in operation and simple to maintain, allowing parts to be repaired and replaced expeditiously.

These objects of the present invention are achieved by placing in a driveway over which vehicles pass a photoelectric cell which is set in the driveway in such a position that light normally incident thereon is intercepted by a vehicle passing over the cell, the cell being connected by an electric circuit to an alarm of either visual or audible type and responsive to the change in the light incident on the cell. The photoelectric cell is set in the driveway in such a manner as to be substantially flush with but just below the surface of the driveway, thereby providing for access of light to the cell over a maximum possible light-gathering angle. It is considered desirable that this angle amount to a solid angle of at least 90° or thereabouts, but it is entirely practical to increase this angle to the range of 120° to 150°, thus approaching rather closely the ideal maximum of 180°.

In a preferred embodiment of the invention, the installation includes a tubular member sat into the driveway and terminating below the surface of the driveway; a housing slidably received in the tubular member and supported thereon; and a photoelectric cell in the housing adjacent a light-transmitting opening in the upper end of the housing. While the photoelectric cell is sealed in the housing and the housing in turn is sealed in the tubular member by a suitable cement or sealing compound in order to prevent access by liquids to the interior of the housing and light cell, the housing is easily removed from the upper end of the tubular member for repair and maintenance. To permit this, the electric conductor leading into the tubular member is provided with sufficient slack to allow the housing to be fully withdrawn from the tubular member.

BRIEF DESCRIPTION OF THE DRAWINGS

How the above and other objects and advantages of the present invention are achieved will be more fully understood by reference to the following description and to the annexed drawings, in which:

FIG. 1 is a plan view of a typical service station installation showing the location of light cells in the apron or driveway adjoining the fuel pumps;

FIG. 2 is an enlarged fragmentary vertical section on line 2—2 of FIG. 1;

FIG. 3 is a further enlarged fragmentary section similar to FIG. 2;

FIG. 4 is a fragmentary vertical section through the concrete and the light cell installation showing a variational form of the invention;

FIG. 5 is another fragmentary vertical section showing a further variational form of the invention;

FIG. 6 is a fragmentary plan view of a variational form of the invention;

FIG. 7 is a fragmentary vertical section on line 7—7 of FIG. 6;

FIG. 8 is a perspective of a wrench for turning the polarizing disc of FIG. 6;

FIGS. 9 and 10 are, respectively, a fragmentary plan and longitudinal section on line 10—10 of FIG. 9 of another embodiment of the invention;

FIG. 11 is a perspective of a further embodiment of the invention; and

FIG. 12 is a fragmentary vertical section on line 12—12 of FIG. 11.

DESCRIPTION OF A PREFERRED EMBODIMENT

Referring now to the drawings, and more particularly to FIG. 1, there is shown a plurality of photoelectric cells 10 which are installed individually in spaced positions in a highway, driveway or other traffic-supporting surface indicated generally at 11. The driveway typically consists of a concrete apron 12 in the vicinity of the fuel pumps 14 which are typically placed on a raised island 15 to protect them against being damaged by a vehicle. The approaches to concrete apron 12 are generally an asphalt macadam or similar type of hard surfacing, the concrete being preferred in the vicinity of the fuel pumps not only because it is more resistant to oil, gasoline, and other petroleum that may be spilled upon it, but also because it is harder and more firm, therefore less likely to be indented by heavy vehicles standing on it. However, the driveway in which the photoelectric cells are installed may, within the scope of the present invention, be all of any one material, either asphalt or concrete. In general, the top surface 12a of the driveway or the like is generally horizontal, but this should be interpreted to include ramps or the like.

Each light cell 10 is connected by a buried conductor 16 passing through a common conduit 18 to a box 19 suitably located inside a building or otherwise removed from the hazardous area around pumps 14 and which contains the alarm and is connected to a suitable source of power.

In many instances, the light cells will be installed in existing driveways, although provision will ordinarily be made for installation prior to pouring a concrete driveway if such an installation is anticipated. FIGS. 2 and 3 show in enlarged vertical section a typical installation which is adapted to existing driveways. Assuming concrete driveway 12 having already been poured and set, the first operation is to drill a hole 20 downwardly from the upper traffic-engaging surface 12a over which vehicles pass. The axis of hole 20 is preferably vertical or nearly so and is of a diameter to take easily a tubular housing 22. A layer 23 of a suitable cement or mastic is preferably placed between housing 22 and the wall of hole 20 in order to provide a fluid-tight connection between the tubular member and the concrete, thus excluding from housing 22 water or any other liquids that might fall upon top surface 12a of the driveway. There are various suitable cements or sealing compounds of either hardening or nonhardening types that may be used for this purpose; a typical cement that has been found satisfactory in use is an epoxy resin such as "form-a-gasket" number 1 produced by Permatex Company, Inc.

The upper end of tube 22 is positioned a short distance below top surface 12a of the driveway, as shown in FIG. 3. Into this upper end of the tube is inserted the housing 25 for the photoelectric cell, the housing preferably being an easy sliding fit within tubular member 22. As may be seen particularly in FIG. 3, the upper end of housing 25 is provided with an annular flange 25a which extends outwardly around the housing at or just above the upper end of tube 22. A layer of sealing compound 24 is placed around light housing 25 between it and tube 22, and the sealing compound preferably extends between flange 25a and the end of tube 22 in order to provide a moisture-tight seal for electrical connections and to assist in holding the housing 25 in place within the tubular sleeve.

The layer of sealing compound 24 is preferably a nonhardening compound such as a nonhardening epoxy resin, an example of which is "form-a-gasket" number 2 manufactured by Permatex Company, Inc. The thickness of flange 25a and the spacing of the end of tube 22 below surface 12a are such that the upper end of cell housing 25 is flush or substantially coplanar with surface 12a, as shown in FIGS. 2 and 3. Thus, the housing rests upon and is supported by the surrounding sleeve which positions the housing to locate the upper end of the housing in the manner described.

Inside housing 25 is a photoelectric cell 27. Although the invention is not limited to any particular type of photoelectric cell, it is preferred to use a photoconductive or resistance type of cell in this system. From the bottom of cell 27 a pair of leads 28 enter plug 29 for connection to externally accessible plug terminals 30. To these terminals 30 are connected two wires of the insulated conductor 16, the terminals normally being then covered by a suitable means such as cap 31 which is screwed onto the base of plug 29. Cap 31 is preferably filled with a mastic or nonhardening sealing compound to cover the metal connections and insulate them from moisture.

Tubular member 22 is slotted axially at one side in order to permit conductor 16 to pass through the slot and reach box 19. A slot of this character is indicated at 32 as preferred to a round hole or the like in the wall of housing 25 as it makes installation of the tubular member and the conductor easier.

Assuming that drive 12 is already in existence, a narrow slot 35 is cut in the drive extending downwardly from top surface 12a to a sufficient depth to pass the upper end of slot 32. This slot terminates at one end at hole 20 and at the other end at any point convenient for access to box 19. This slot need only be wide enough to receive conductor 16 which is laid in the slot, the depth of the slot in the driveway being sufficient to receive the conductor where it comes out of tubular member 22. As seen in FIG. 1, several conductors may be placed in a common conduit 18, which may be only a slot or trench as just described. After the rest of the installation is completed, the slot is back-filled with a suitable mastic or mortar 36 in order to bury conductor 16 and isolate it from damaging contact with moving objects, fluids, and the like.

It will be noted that tubular housing 22 and hole 20 are somewhat deeper than slot 35 in the concrete, thus allowing a limited amount of excess conductor 16 to be stored in a coil 16c or other configuration in tube 22 beneath cell housing 25, as shown particularly in FIG. 2. This excess length of conductor is sufficient in length to equal or to exceed the vertical length of housing 25 so that the housing can be withdrawn from tubular member 22, and so become completely accessible for repair and/or replacement of parts.

Cell housing 25 has a downwardly facing shoulder at 37 which engages the upper end of photoelectric cell 27 to locate the cell a short distance below the plane of driveway surface 12a, the object being to get the photoelectric elements of the cell as close to the driveway surface 12a as practical, and yet locate them slightly below the surface for protection.

Light cell 27 is preferably spaced above plug 29 and is held against the shoulder 37 by the spring-like action of wire leads 28. The wire leads are preferably twisted, by rotating cell 27 slightly to give them a spiral-like configuration. The cell can then be depressed by force from above, yielding without damage. Of course, other resilient support means for the light cell may be provided to support the photoelectric cell with its top surface substantially flush with but preferably slightly below surface 12a on which vehicles are supported. The axis of light cell 27 is preferably vertical in order to eliminate any directional characteristics.

Above photoelectric cell 27, the interior bore of housing 25 is closed by a transparent window 38 which is necessarily light-transmissive in order to permit light from above the driveway to reach the cell in housing 25. Any suitable transparent material may be used for this purpose, but it is preferred to use some of the transparent synthetic resins, such as some of the acrylics. This light-transmitting window is made of only sufficient thickness to have the physical strength required to resist breaking, but ordinarily it need not be more than about one-sixteenth to one-eighth inch thick. It is cemented in place flush with the upper end surface of housing 25.

Immediately below the window 38 is mask 39 which is only partially light-transmissive. This mask is used to control the amount of incident light actually reaching photocell 27. The mask may be a homogeneous material that is translucent or it may be an opaque material having transparent areas, such as small holes in it, or a combination of both. The purpose of mask 39 is to establish a variable control over the amount of incident light passed to the photocell, thus accomplishing either or both of two purposes. In the first place, photocells have a certain amount of variance in their resistivity and consequently it is more practical to compensate for this by changing the amount of incident light on the photocell. The other advantage of this arrangement is that it permits the installer to compensate for local conditions, thus permitting a single cell to be used under a wide range of light conditions as, for example, under a canopy where there is less direct light than would be the case if the same cell were installed in an open driveway in direct sunlight.

One of the shortcomings of many earlier types of installations has been the tendency to give false signals. While this has been ascribed to the sensitivity of the photocells, it has actually been in many cases caused by the type of installation and location of the cell so that it responds to transient signals, such as an individual walking past the cell as opposed to an automobile or vehicle and causing the cell to actuate the signal system. This characteristic of the signal system has been substantially eliminated in the present invention.

The light cell is so located that it is facing upwardly and therefore receives a maximum amount of illumination by day or even from artificial sources above the ground and at the same time is located very close to the top surface of driveway 12a so that the light cell has the maximum light-gathering angle 40 as indicated in FIG. 3. This light-gathering angle 40 is of course a solid angle since light reaches the cell from all directions. It is designed to have a minimum value of 90° and it is practical in many installations to reach 120° to 140°. The precise angle is of course a function of the distance that the photoelectric elements of cell 27 are located below the plane of surface 12a and also the diameter of the opening occupied by window 38. For a given depth of the cell below surface 12a, the solid angle in which light reaches the cell is increased by increasing the diameter of window 38; or for a given diameter of the window, the angle is likewise increased by moving the cell upwardly, decreasing the thickness of window 38. Ideally, light should be gathered over an entire hemisphere having a solid angle of 180°, but this is often not practical since it is usually desired to have no protrusions above the plane of surface 12a and at the same time to afford complete protection to the light cell.

Having a large light-gathering angle as mentioned results in light reaching the cell at the same time from many different directions and the cell is not activated by transient shadows from small objects such as an individual walking past or even over the cell. This is because the shadow cast by an individual reduces the total light reaching the cell by only a very small percentage. It requires an automotive vehicle passing over the cell, and thereby eliminating substantially all the light directly incident on the cell, to cause it to activate the alarm system. As is well known, vehicles currently have rather low road clearance and provide an area of several square feet over which light is largely blacked out. An object of this size is adequate to block almost all of the light within the solid angle 40.

Of course, a hole as at 20 can be molded in the concrete when it is poured by inserting a suitable form so that the hole 20 may be formed by means other than drilling. However, in the event that installation of a light cell of this character is anticipated before the concrete is poured, it is generally preferable to provide for leading the conductor 16 to the light cell housing 25 through a suitable conduit 42 as shown in FIG. 4. This conduit is placed before the concrete is poured and is then buried in the concrete. The conductor 16 can then be pulled into conduit 42 after the concrete has hardened. The end of the conduit receives housing 25 in the same manner as described above in connection with tubular member 22, the installation being generally similar. Of course, as before, the upper end of cell housing 25 is so positioned with respect to the finished grade of surface 12a of the driveway that it is flush with traffic surface 12a.

Except as specifically noted, the installation of the light cell in a driveway in a length of conduit 42 placed prior to pouring the concrete is essentially the same as already described in connection with FIG. 3. Of course, there is no longer a need for the slot 35 since conductor 16 leaves the conduit through the open end thereof.

Although the installation as last described is preferred under some circumstances, the invention is not necessarily limited to all of these same features. For example, there is shown in FIG. 5 a variational form of the invention which combines structures already described and adds some others, while it also permits placement prior to pouring the concrete. It produces the desired location of the light cell with reference to the top surface of the driveway but differs in details of the installation from those already described.

In FIG. 5, the wires of conductor 16 are connected to terminals of a plug 45 which is cemented in place inside the rigid sleeve or tube 46 with a nonhardening sealing compound as described above. Sleeve 46 serves as an extension of conduit 42 with the sleeve 46 cemented in the open end of conduit 42. If sleeve 46 is used also as a form around which the concrete is poured, it may be greased or otherwise suitably coated so that the sleeve does not adhere to the surrounding concrete tightly enough to prevent its removal for servicing. The base of the sleeve is filled with a sealant 48 to cover and protect the connection of the conductor to the terminals 49 on plug 45. Plug 45 is provided with two metal sleeve terminals 49 which are designed to receive slidably prongs 50 projecting downwardly below cell housing 25b which contains a light cell in the manner already described. In this case, the leads from the photocell are connected to prongs 50 and the entire housing can be inserted and removed from the end of tubular sleeve 46. In so doing, the circuit is broken by removing prongs 50 from the terminals 49 of plug 45.

Various changes in the details, construction and installation of the light cell are possible, and a few of these will now be illustrated and described. For example, there is shown in FIGS. 6 and 7 a light cell installation which is similar to that illustrated in FIG. 3, except that the light-admitting window and the light mask for controlling the quantity of light admitted to light cell 27 have been replaced by a pair of plane-polarizing plates 55 and 56 controlling light admission. Plates 55 and 56 may be discs of the well-known light-polarizing material commonly known as "Polaroid" which transmit a maximum amount of light when their axes are aligned but which transmit a minimum amount of light when their axes are rotated 90° relative to each other.

As shown in FIG. 6, upper disc 55 is provided with peripheral notches 57 which may be engaged by projecting fingers 58 on tool 60, by lowering the tool of FIG. 8 from the dotted line position of FIG. 7. Using the tool, the top disc can be rotated to any desired position to admit to light cell 27 the desired maximum of light, after which the upper disc can be held in the adjusted position by filling peripheral indentations with a suitable sealant which also operates to hold the disc in place.

Although two physically distinct members are here used to regulate the amount of light transmitted to the light cell, the functions of admitting light and controlling the amount of light so admitted are combined into these two members rather than performed by separate members as in the form of the invention described in FIG. 3.

FIGS. 9 and 10 illustrate a variational arrangement in which the upper polarizing disc 55a is made without peripheral indentations but is of slightly reduced diameter as compared with the diameter of the circular recess 61 in the light cell housing. The annular clearance between the polarizing disc and the cell housing permits the disc to be rotated freely into the desired position relative to disc 56 beneath it, after which the upper disc is secured in place by filling the angular space around it with sealant, as indicated at 62 in FIG. 10.

The forms of the invention shown in FIGS. 7 and 10 both have the advantage that they are easily adjustable in the field to operate properly under the exact light conditions encountered at the site of installation, and a continuous gradation of light transmission through the polarizing discs 55 and 56 can be obtained between maximum and minimum values by relative rotation of the discs.

Suitable epoxy resin cements are available which are highly satisfactory for a sealant and cement for the discs and which can be removed by a suitable solvent. Removal of the resin permits subsequent adjustment of the value of the transmitted light reaching cell 27 without removing the entire unit or replacing it.

The installations of the light cells previously described have all contemplated permanent installations in areas subjected to traffic where it is desired to eliminate any significant projections above the traffic surface. However, for temporary installations or use in locations where traffic is relatively light and consequently minor irregularities in otherwise planar traffic surface are not objectionable, the installation shown in FIGS. 11 and 12 may be used. Here the supporting structure for the light cell 27 is a thin, disc-like structure 65 which may be molded or cast from a suitable material, such as a synthetic resin or metal.

Disc 65 is preferably little thicker than is necessary to accommodate the light cell 27 and the connections thereto and preferably has a convex upper surface, thus giving to the disc a low profile so that automobile tires can roll over the disc without any difficulty. Mounted upon a surrounding planar surface 66, such as a roadway, driveway, or other surface carrying automobile traffic, the upper surface of disc 65 then becomes itself a traffic-bearing surface.

As shown in FIG. 3, light cell 27 is located at the center of the disc with its upper surface substantially flush with the top surface of disc 65 and is held in place in the disc by a body of cement 67 which acts not only to secure the light cell in place but also as a sealant to enclose and insulate the connections to the terminals of the light cell. Electrical connections to light cell 27 are preferably effected by a pair of wires in a flat, tape-like conductor 68 which, because of its shape, offers a minimum projection above the surrounding traffic surface and also is easily fastened to a street or roadway by pressure-sensitive tape. Such means of securing conductor 68 in place is secure but easily removable.

The light cell is shown in FIGS. 11 and 12 as having its top surface substantially flush with the top surface of disc 65, thus affording maximum light-gathering angle to the cell. Under the circumstances, the total solid light-gathering angle may be 160° or more, and even closely approach a full ideal 180°. To obtain this maximum exposure angle, the light-transmitting window and the light control mask described in connection with other embodiments have both been eliminated. However, they both may be incorporated in the form of FIGS. 11 and 12, if desired.

The body of cement 67 is preferably of the non-hardening variety to absorb a certain amount of the shock imposed upon the light cell as an automobile tire or the like rolls over the light cell.

Installations of the type last described may be used for a number of purposes where it is desired to sense the movement or the passage of a vehicle. For example, the light cell may be installed in this manner in a street to operate a traffic counter or a traffic signal as well as to operate an alarm or signal to alert personnel to the presence or movement of a vehicle. As a further example of the versatility of the last described installation, there is shown in FIG. 1 a disc 65 mounted at each side of the doorway 70 into the service station office, which is typical of any building. Thus a person passing either of the light cells mounted in these discs would be sensed by the device and give rise to a signal from the alarm in box 19. In this instance, the light cells are not mounted on a horizontal surface but on a vertical face of a building wall with the axes of the cells horizontal; but they can be designed to be sufficiently responsive to the passage nearby of a person entering or leaving the building through doorway 70. In order to insure adequate shadow to produce a triggering response, a flood light 71 is usually directed upon the light cell so that the triggering shadow will impinge upon the sensor as the object passes by.

From the foregoing disclosure, it will be understood that various changes may be made in the arrangement and construction of the elements of the present invention, and accordingly it is to be understood that the above description is considered as illustrative of, rather than limitative upon, the invention as defined by the appended claims.

I claim:

1. The method of installing a partially light transmissive mask and a light sensor in a driveway for response to vehicles or the like, there being an electrical conductor connected to the sensor, that includes:
   drilling a hole in the driveway from the top surface thereof;
   cutting a groove in the driveway extending away from said hole for receiving said electrical conductor;
   inserting a tubular member in the hole spaced from said surface with said conductor extending therefrom in said groove in the driveway;
   thereafter inserting said sensor in the tubular member to be positioned thereby and to be freely upwardly removable therefrom, installing said mask in closely overlying relation to the sensor to provide access of light through the mask to the sensor over a solid angle of at least about 120° with the apex of said solid angle located near the top of the sensor and periodically withdrawing the sensor and mask upwardly from said tubular member for inspection, servicing or replacement.

2. The method of installing said sensor and mask as in claim 1 wherein the sensor is inserted in said member by installing the sensor and mask in a housing and inserting the housing in the member to be substantially flush with said surface of the driveway.

3. The method of installing a photoelectric cell as in claim 1 in which the light receiving uppermost portion of the cell is positioned below but within about one-eighth inch from said surface of the driveway.

4. The method of installing a photoelectric cell in a driveway for response to vehicles or the like, there being a housing for the cell and a flexible electrical conductor connected with the cell, that includes:
   drilling a hole in the driveway from the top surface thereof;
   cutting a groove in the driveway extending away from said hole;
   inserting a tubular member in the hole spaced a predetermined distance from said surface with said conductor extending therefrom in said groove in the driveway; and
   inserting the cell housing with the cell therein near the upper end of the housing, into the tubular member and positioning the cell below the driveway surface by engagement of the housing with one end of the tubular member, cell insertion being carried out to provide an excess slack length of the conductor in coil configuration below the sensor and in the hole and below the housing and so that the cell housing remains freely upwardly removable from the tubular member and to an extent afforded by said slack length.

5. The method of installing an electrical-type sensor in a driveway for response to passage thereover of vehicles or the like, there being an electrical conductor connected to the sensor, that includes:
   a. forming a hole in the driveway from the top surface thereof,
   b. installing a tubular member under the top surface of the driveway extending away from said hole for receiving said conductor,
   c. installing said conductor in said tubular member for concealment therein, and
   d. installing said sensor in the end of the tubular member at a location therein to be responsive as aforesaid and installing a light mask at the upper slide of said sensor,
   e. said sensor installation being carried out to store and excess length of the conductor in the hole directly below the sensor with the sensor remaining freely upwardly removable from said hole thereby to permit periodic upward withdrawal of the sensor from the hole and without disconnecting the sensor from the conductor for inspection, servicing or replacement.

6. The method of claim 5 wherein the sensor comprises a photoelectric cell, and said installation thereof in the hole is carried out to locate the light receiving uppermost portion of the cell below the level of said driveway surface but closely adjacent thereto to provide access of light to the cell over a solid angle of at least about 120° and the apex of which is located near the top of the sensor.

* * * * *